United States Patent [19]

Allred

[11] Patent Number: 5,021,802
[45] Date of Patent: Jun. 4, 1991

[54] THERMALLY REVERSIBLE SOL-GEL PHASE CHANGE INK OR BUBBLE JET INK

[75] Inventor: Donald R. Allred, Brookfield, Conn.

[73] Assignee: Dataproducts Corporation, Woodland Hills, Calif.

[21] Appl. No.: 346,371

[22] Filed: Apr. 28, 1989

Related U.S. Application Data

[63] Continuation of Ser. No. 158,211, Feb. 19, 1988, abandoned.

[51] Int. Cl.$^5$ .......................... B41J 2/01; C09D 11/02
[52] U.S. Cl. ................................ 346/1.1; 346/140 R; 106/20; 106/22; 106/23
[58] Field of Search .................. 106/20, 22, 23, 25, 106/217; 346/1.1, 140 R

[56] References Cited

U.S. PATENT DOCUMENTS

| | | | |
|---|---|---|---|
| 3,391,081 | 7/1968 | Conrady | 252/34.7 |
| 4,299,630 | 11/1981 | Hwang | 106/22 |
| 4,352,901 | 10/1982 | Maxwell et al. | 524/38 |
| 4,390,369 | 6/1983 | Merritt et al. | 106/31 |
| 4,475,950 | 10/1984 | Finlayson | 106/20 |
| 4,490,731 | 12/1984 | Vaught | 106/22 |
| 4,671,691 | 6/1987 | Case et al. | 106/22 |
| 4,684,956 | 8/1987 | Ball | 346/1.1 |
| 4,686,246 | 8/1987 | Gajria | 523/161 |
| 4,838,940 | 6/1989 | Kan et al. | 106/22 |

FOREIGN PATENT DOCUMENTS 56-151778 11/1981 Japan .
62-181372 8/1987 Japan .

OTHER PUBLICATIONS

Pamphlet entitled "Carrageenan" published by the FMC Corporation, 37 pages, 1977.
Derwent Abstracts, an 82-03091E/02, "Ink Composition for Writing Instruments", Japanese Patent, J56-151778, Nov. 24, 1981.
Hawley, Gessner, G., *Condensed Chemical Dictionary*, 10th Edition, pp. 492, 956-958.

*Primary Examiner*—Paul Lieberman
*Assistant Examiner*—Christine A. Skane
*Attorney, Agent, or Firm*—Woodcock Washburn Kurtz Mackiewicz & Norris

[57] ABSTRACT

Novel impulse ink or bubble jet inks are disclosed which comprise 90–99.9% by weight of aqueous sol-gel medium and 0.1–10% by weight colorant. The inks are thermally reversible sol-gels which are gels at ambient temperatures and sols at temperatures between about 40°–100° C.

8 Claims, No Drawings

THERMALLY REVERSIBLE SOL-GEL PHASE CHANGE INK OR BUBBLE JET INK

This is a continuation of application Ser. No. 158,211, filed Feb. 19, 1988, now abandoned.

CROSS-REFERENCE TO RELATED APPLICATIONS

This application is related to a number of patents and pending applications which have been assigned to the assignee of the present application. These related patents and applications, the disclosures of which are hereby incorporated by reference, are: U.S. Ser. No. 331,604, filed Dec. 17, 1981, now U.S. Pat. No. 4,390,369 entitled "Natural Wax-Containing Ink Jet Inks" and its continuation U.S. Ser. No. 507,918, filed June 27, 1983; U.S. Pat. No. 4,361,843, entitled "Improved Ink Jet Compositions and Methods"; U.S. Ser. No. 394,154, filed July 1, 1982, entitled "Stearic Acid Containing Ink Jet Inks", now abandoned, and its continuation U.S. Ser. No. 565,124, filed Dec. 23, 1983; U.S. Pat. No. 4,386,961, entitled "Heterologous Ink Jet Ink Compositions", and its continuation U.S. Ser. No. 501,074, filed June 5, 1983; U.S. Ser. No. 668,095, filed Nov. 5, 1984, now abandoned, and its continuation U.S. Ser. No. 006,727, filed Jan. 23, 1987; U.S. Ser. No. 672,587, filed Nov. 16, 1984, entitled "Low Corrosion Impulse Ink Jet Ink", now abandoned, and its continuation U.S. Ser. No. 037,062, filed Apr. 13, 1987.

BACKGROUND OF THE INVENTION

This invention relates to the field of impulse ink and bubble jet printing, and more particularly to the field of impulse ink or bubble jet inks which are used in printers which contain drop-on-demand impulse ink jet heads. Such printers are normally used with a number of substrates, the most common of which are papers of various porosities. In order to achieve an acceptable print quality, it is known to carefully select the substrate materials to be printed to match them to the particular characteristics of the ink which is being jetted. Such careful selection is possible in certain environments, such as in large scale package printing operations, but is not preferred in many environments where there is less control over the selection of the substrate for use with the particular ink. Accordingly, a need exists for impulse ink jet inks which are useful with a wide range of substrates.

Many impulse ink jet inks known to the art are liquid inks which can be either water-based or nonaqueous inks. These inks have many advantages. They are easy to store and ship (provided the colorant is readily soluble in the vehicle system) and normally exhibit low viscosities at room temperature, making them quite easy to jet. On the other hand, liquid inks tend to penetrate and spread when jetted onto a porous substrate such as high rag content bond paper. As a result, it is difficult to achieve letter quality print with liquid impulse ink jet inks without using special substrates. Often the print has a washed out and diffuse appearance. At the present time, liquid impulse ink jet printing systems have achieved only limited acceptance in the general office environment.

It is also known to use solid-liquid phase change inks, i.e., inks which are solid at room temperature but which are readily melted for jetting. These inks are referred to, for example, in U.S. Pat. Nos. 4,490,731, 3,653,932, 3,715,219 and 4,390,369. These "hot-melt" inks normally comprise vehicles, such as natural waxes, resins and/or long chain fatty acids, esters or alcohols which melt when the ink is heated to jetting temperatures. Upon jetting, heated droplets impact the substrate and immediately freeze on the substrate surface. This phenomenon is advantageous in several respects in that dark, sharply defined print may be produced. This print may be slightly raised, suggesting that the print is engraved. Since the ink is solid at room temperature, during storage and shipment the colorant systems have less of a tendency to separate out of the ink. This has facilitated the use of various colorant systems, such as certain pigment based systems, which would not normally have been used in liquid inks.

There are also, however, disadvantages to many hot-melt phase change inks. There are certain conditions of use and/or storage where ambient temperatures to which the printed materials are exposed far exceed room temperatures. Papers stored in the trunk of an automobile on a sunny day may, for example, experience a temperature far exceeding 100° F. (38° C.). Under such conditions, phase change inks may remelt, causing unwanted adherence to adjacent pages in regions where the original print was raised above the surface of the substrate. Because they are solid at room temperature and tend to be located at the surface of the substrate, hot-melt inks are also prone to burnishing, cracking or flaking. Proper use of hot melt inks therefor requires proper selection of the ink for the intended conditions of use. It is advantageous to select the substrate and jetting conditions to obtain some degree of ink penetration while achieving desirable print characteristics.

Notwithstanding the substantial advances achieved in the development of ink jet inks for use with drop on demand printers, a need still exists for inks which will produce dark, clearly defined print on a wide range of substrates and which will not crack, smear, flake off or burnish.

SUMMARY OF THE INVENTION

The present invention provides a novel ink jet or bubble jet ink which is a gel at ambient (room) temperatures. The subject ink combines the advantageous properties of thermal phase change inks and liquid inks. More particularly, the inks of the present invention comprise 90–99.9 % by weight of an aqueous sol-gel medium, such as a carrageenan and water, which gels at room temperature and which breaks to form a sol at higher jetting temperatures, and 0.1–10% by weight colorant. Because of the sol-gel nature of these inks, they typically comprise more that 90% water, yet they do not behave in the same manner as other aqueous inks, particularly in connection with the penetration and spreading aspects of those inks when jetted.

The inks of this invention are impulse jetted at an elevated temperature in the range of about 40°–110° C., preferably about 70° C., (measured, e.g., on a Brookfield Thermosel viscometer) at which temperature the ink has a viscosity of about 3–15, preferably 4–7, centipoise. The subject inks exhibit controlled penetration and spreading, but do not remain on the surface of most substrates where they would be prone to smearing or flaking.

DETAILED DESCRIPTION OF THE INVENTION

This invention provides a novel ink for use with drop on demand (impulse) ink jet or bubble jet printers. Such printers are widely known to the art. They jet ink by ejecting drops, individually or in bursts, upon demand. This is usually accomplished by providing a piezoelectric print head which receives ink from a supply. This method is to be distinguished from other jet printing methods which substantially continuously jet drops, some or all of which are deflected electrostatically. The inks of this invention may be used both in traditional transducer driven ink jet printers as well as in thermal bubble style printers.

A transducer driven ink jet printer typically comprises an ink jet chamber including an orifice from which droplets are ejected and an ink supply inlet coupled to a source or reservoir of ink. In such a jet, a driver is coupled to the chamber such that the change in state of energization of the driver results in the ejection of a droplet of ink from the orifice. By changing the state of energization of the driver at the appropriate moment, a droplet of ink may be ejected on demand in a trajectory directed at a suitable substrate or target such as paper. U.S. Pat. Nos. 4,459,601 and 4,646,106 disclose an ink jet apparatus comprising an array of demand or impulse ink jets where each jet ejects a droplet of ink from an orifice in response to the expansion and contraction of drivers in the form of elongated transducers which are energized in response to a field selectively applied transversely to the axis of elongation. An example is the SI480 printer from Data-Products Corporation.

In bubble jet printers, controlled and localized heat transfer is provided to a defined volume of ink which is located adjacent to an ink jet orifice. This heat transfer is sufficient to vaporize the ink in such volume and cause it to expand, thereby ejecting ink from the orifice during the printing of characters on a print medium. An example of a commercially available bubble jet printer is the Think Jet Printer available from Hewlett-Packard Company.

The vehicle for the colorant in the inks of this invention is an aqueous sol-gel medium. A gel has been defined as a two-phase colloidal system consisting of a solid and a liquid. Gels behave as elastic solids and retain their characteristic shape, whereas sols (colloidal dispersions) possess the shape of the container. When combined with colorant to form the inks of this invention, suitable sol-gel media create an ink which is a gel at ambient (room) temperature and a sol at the temperatures used for impulse jetting, about 40°–100° C. The ink must also be thermally reversible, i.e., it must be capable of repeatedly "melting" on heating and gelling on cooling.

Numerous hydrocolloids are known in the art which form gels on heating and cooling that are thermally reversible. It has been found that the carrageenans, and especially iota-carrageenan, are particularly useful for preparing the sol-gel medium used in the inks of this invention. Carrageenan is the hydrocolloid extracted with water of aqueous alkali from certain red seaweeds of the class Rhodophyceae, and separated from the solution by precipitation with alcohol, by drum-roll drying or by freezing. Iota-carrageenan is particularly preferred for use in this invention because, along with possessing the necessary thermal reversibility, it also produces gels that are free of syneresis, i.e. in which the solids and liquid do not separate.

In the preferred embodiment, the aqueous sol-gel medium comprises between about 0.25 and 0.50 weight percent of iota-carrageenan. The gel-sol transition temperature of the medium rises as the concentration of the iota-carrageenan increases. At concentrations of about 0.50 weight percent, the gel-sol transition temperature too closely approaches the boiling point of water. At concentrations below about 0.25 weight percent, the gel-sol transition temperature is not significantly enough above room temperature.

One advantage to use of carrageenans in the inks of this invention stems from the physiological acceptance of these materials. Since carrageenan is edible, the inks can be formulated with water, the carrageenan and an edible dye to yield a physiologically acceptable ink useful on pharmaceutical tablets and foodstuffs. The enhanced dot quality stemming from use of the inks of this invention can be attained on any porous media.

A variety of compatible colorant systems known to the art may be used in the ink of this invention. Such systems are preferably cationic or mildly anionic species. The carregeenans are mostly stable in a pH range of 7–11; at pH's lower than about 3.5, the carregeenan may hydrolyze and become noneffective for gelling. Therefore, the most preferred dyes are basic dyes such as Color Index (CI) Solvent black 5, CI Basic yellow 37, CI Basic red 1, CI Basic violet 10, and CI Basic blue 81. Dyes which would be mildly acidic such as CI acid class dyes including Acid red 1, Acid yellow 36 and Acid blue 9, can be used provided the pH of the system remains above about 3.5.

The inks of this invention may further comprise one or more additives such as surfactants (e.g., nonionic polyether surfactants) or humectants which additives tend to inhibit evaporation of water and thereby enhance wetting.

The sol-gel media defined herein, when formulated into the desired inks, possess desirable properties of both liquid and solid inks when jetted. When these inks impact a substrate, they do not freeze into a solid which remains on the surface. When the substrate is porous, such as a paper, these inks will migrate into the fibers where they will become absorbed. On the other hand, the ink migration of the herein described inks differ in character from that of conventional liquid inks because the inks of this invention will resist lateral spreading prior to absorbtion.

The inks of this invention are supplied as a gel and must be melted into the sol state to allow the ink to flow into the jetting chambers of the printer. Optionally the ink can be filled into disposable heads at the factory and thus would not require additional melting except to allow the ink to flow to the jetting chambers. Thus, the ink jet must have a heater to keep the ink in the liquid state and ready for firing. When the printer is turned off, the ink will cool and gel. This will decrease the risk of air entrapment from cavitation as occurs in typical phase change devices. It will also reduce the amount of water that is allowed to evaporate and reduce the usual evaporation of a typical waterbased ink jet.

The present invention will further be understood from the inks listed in the examples of Table I.

TABLE I

| Component | Weight Percent | | |
|---|---|---|---|
| | Ex. 1 | Ex. 2 | Ex. 3 |
| Water | 94.0 | 99.0 | 99.25 |
| Iota-Carrageenan | 0.5 | 0.5 | 0.25 |
| Triton X-1000 (nonionic polyether surfactant) | 5.0 | — | — |
| Pontamine Black SP-liquid (special purified) | 0.5 | 0.5 | 0.5 |
| Viscosity*, cps (30° C.) | — | >100 | >20 |
| (70° C.) | — | 6.5 | 4.7 |
| Melt Temperature, °C. | — | 55 | 45 |

*Measured on a Brookfield Thermosel viscometer at a spindle speed of 30 rpm.

The ink of Example 2 was prepared and jetted from an impulse ink jet apparatus on a Hammer mill bond and was suitable for jetting.

From the above, those of ordinary skill in the art will recognize that various departures can be made from the materials and methods described in this application without departing from the scope thereof, which is more particularly defined in the claims appended hereto. For example, those of ordinary skill in this art will appreciate that the primary object of this invention is to provide an aqueous thermally reversible sol-gel ink which is a gel at ambient temperatures, and that other materials and material mixtures could accomplish this desired result and achieve the objectives of this invention, provided those materials and the resulting ink which utilizes them satisfy the other requirements set forth in this disclosure.

What is claimed is:

1. A method of ink jet printing comprising:
   (a) providing a thermally reversible aqueous sol-gel ink which is a gel at ambient temperature and a sol at temperatures between about 40° C.–100° C., said ink comprising:
      (i) 90–99.9% by weight aqueous sol-gel medium which medium is substantially free of syneresis; and
      (ii) 0.1–10% by weight colorant;
   (b) elevating the temperature of said ink to between about 40°–100° C. to cause said ink to form a sol; and
   (c) jetting said ink onto a substrate; whereby said ink forms a gel upon cooling on said substrate.

2. A method according to claim 1 wherein said aqueous sol-gel medium comprises iota-carrageenan.

3. A method according to claim 2 wherein said aqueous sol-gel medium comprises about 0.25–0.5% by weight of iota-carrageenan.

4. A method according to claim 1 wherein said ink has a viscosity in the range of about 3–15 cps at 70° C.

5. A method according to claim 4 wherein said ink has a viscosity in the range of about 4–7 cps at 70° C.

6. A method according to claim 3 wherein said ink has a viscosity in the range of about 4–7 cps at 70° C.

7. A method according to claim 1 wherein said ink is jetted using a transducer driven impulse ink jet printer.

8. A method according to claim 1 wherein said ink is jetted using a bubble style printer.

* * * * *